United States Patent [19]
Littwin

[11] 3,774,050
[45] Nov. 20, 1973

[54] MAGNETIC HOLDING MEANS - STANDBY

[76] Inventor: Arthur K. Littwin, 6555 LeMai, Lincolnwood, Ill.

[22] Filed: Mar. 13, 1972

[21] Appl. No.: 234,253

[52] U.S. Cl................... 307/66, 317/154, 317/123
[51] Int. Cl.............................................. H02j 9/00
[58] Field of Search.......................... 317/154, 123; 307/64, 65, 66

[56] References Cited
UNITED STATES PATENTS

3,339,081   8/1967   Borden et al. ..................... 307/66
3,573,483   4/1971   White ................................. 307/66

*Primary Examiner*—Herman J. Hohauser
*Attorney*—Paul H. Gallagher

[57] ABSTRACT

Magnetic holding means such as a lift magnet or as used in a chuck for holding a workpiece in place; the magnet is magnetized normally by the usual power source, but in the event of failure of that source, a standby source, such as a battery, is brought into service; the battery is maintained fully charged automatically, under control of the state of charge of the battery itself.

17 Claims, 4 Drawing Figures

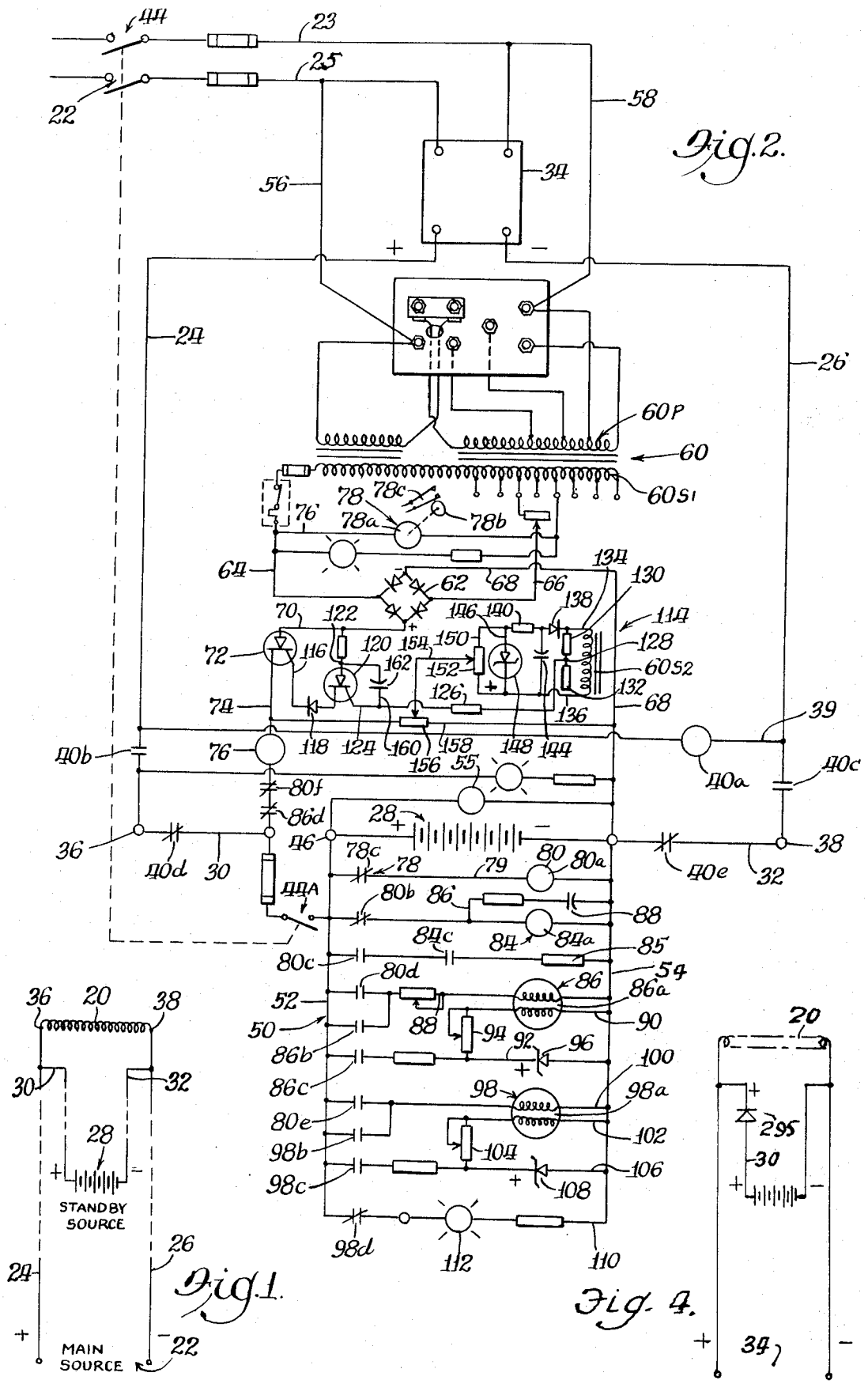

MAGNETIC HOLDING MEANS - STANDBY

OBJECTS OF THE INVENTION

A broad object of the invention is to provide a novel arrangement of standby power source for magnetic holding means.

Another object is to provide a standby electrical power source for a magnetic holding means, with means for automatically maintaining a substantially full charge condition thereof.

Another object is to provide a standby power source for a magnetic holding means including novel signalling means to indicate the state of charge of the standby source, as well as the state of the holding effect thereof when the latter is brought into play.

An additional object is to provide a standby power source of the character mentioned, with means for automatically charging that source, and with means for preventing overcharge thereof.

A further object is to provide a standby power source of the character referred to with novel means for checking the state of charge thereof.

DESCRIPTION OF A PREFERRED EMBODIMENT

In the drawings:

FIG. 1 is a diagram of a fragment of an electrical circuit indicating the normal or main source and the standby source;

FIG. 2 is a diagram of the electrical circuit of a main form of the invention;

FIG. 4 is a fragment of a circuit similar to FIG. 1 showing another modified form of the invention.

Figure 3:
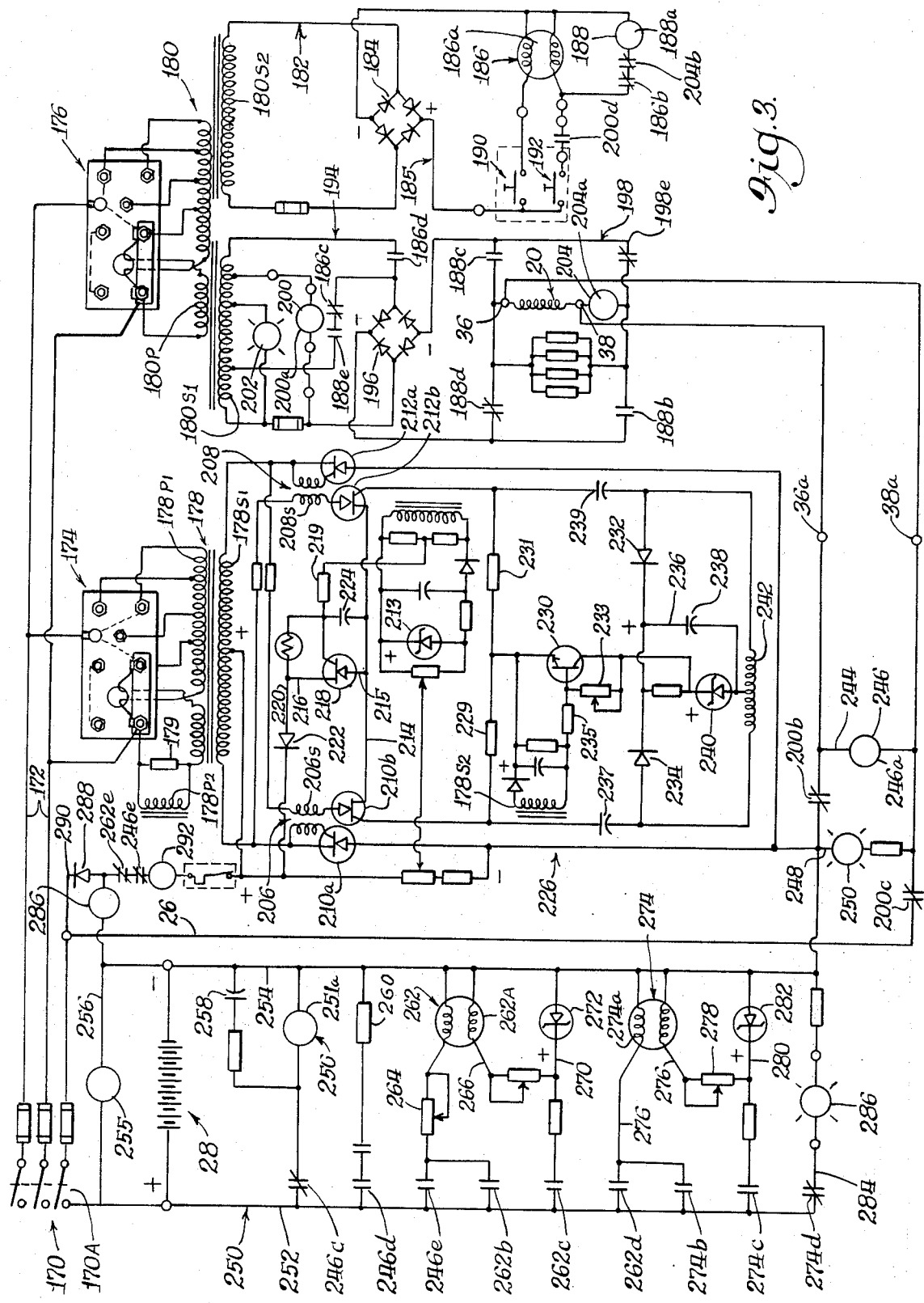
FIG. 3 is a diagram of an electrical circuit of a modified form of the invention.

The control device may be used in connection with a lift magnet, for example in conjunction with a magnet in a chuck for holding a workpiece, the consideration being in any case that when the main power source fails, the standby source comes into play. The magnet to be controlled is shown at 20.

FIG. 1 shows a simplified fragment of a circuit controlling the magnet, and particularly shows a main source 22 having conductors 24, 26 leading to the magnet 20, and a standby source or battery 28 having conductors 30, 32 leading to the magnet. In normal operation, the magnet is magnetized by the main source, but in the event of the failure of the main source, the standby source is brought into service for a substantial period of time, calculated to be long enough for the main source to be corrected pursuant to failure.

Detail reference is made to FIG. 2 and in this diagram the usual electrical AC source 22 is shown, being derived from the usual electrical supply, including conductors 23, 25 leading to a suitable rectifier 34, from which the conductors 24, 26 lead to the magnet, through posts 36, 38, these posts being shown also in FIG. 1. The standby source 28 is also connected through these posts to the magnet.

The circuit of FIG. 2 includes a relay circuit including a conductor 39 having relay means 40 therein, including a coil 40a directly in that conductor, contacts 40b, 40c in the conductors 24, 26, and contacts 40d, 40e in the conductors 30, 32, leading from the battery 28 to the posts 36, 38 and thus to the magnet.

In the normal operation of the apparatus, when the circuit, as represented in FIG. 2, is energized, the normally open contacts 40b, 40c are closed, to energize the magnet. At the same time, the normally closed contacts 40d, 40e are held open, disconnecting the battery from the magnet, and also from the main source 22.

The overall circuit includes disconnect switch means 44 to control main lines 23, 25, this switch means including another switch 44A which directly controls the condition of the standby battery 28.

The battery 28 is connected to posts 46, 48, the latter being connected with conductor 32 and then the post 38, and the former through switch 44A to the conductor 30 and to the post 36. When these various components are connected in circuit, the standby battery then is effective for energizing the magnet, as described more fully hereinbelow.

So long as the main source 22 remains energized, the relay 40 also remains energized and operates as above described. The switch means 44, including the switch 44A, remains closed during the complete operation, the latter serving to retain the circuit closed from the battery to the magnet.

The battery 28 is included in a subcircuit 50, having conductors 52, 54 connected with the posts 46, 48. The conductor 54 is connected directly with the conductor 32, while the conductor 52 is connected with the conductor 30 when the switch 44A is closed.

A voltmeter 55 is connected parallel with the battery. Although the magnet is energized, and the battery charged by DC, the usual AC source is utilized, through the rectifier, but the AC transformer 60 is provided, leading from the AC source through the conductors 56, 58, having a primary 60P and secondaries 60S1, 60S2. The secondary 60S1 is connected with a rectifier 62 through a conductor 64 at one side, and a conductor 66 at the other side through one of a plurality of taps of the secondary.

The negative side of the rectifier 62 leads through a conductor 68 directly to the negative side of the battery 28, while the positive side of the rectifier leads through a conductor 70 to an SCR 72, then to a conductor 74 having an ammeter 76, then to the switch 44A and then back to the subcircuit 50, and thus to the battery 28.

Connected between the conductors 64, 66 is another conductor 77 including a test signal relay 78 of known kind which is motorized, including a motor 78a driving a cam 78b which in turn actuates contacts 78c which appear again in the subcircuit 50. The relay 78 is timed to actuate the contacts, e.g., close them, periodically, such as every two hours and to retain them closed for about 10 seconds. The contacts 78c are in a conductor 79, in the subcircuit 50, this conductor including a test signal relay 80. Upon energization of the relay 80, the contacts 80f are closed completing circuit from the SCR 72 to the battery.

Contacts 80b are in a conductor 82 which includes another relay 84 having its coil 84a directly in that conductor, and the conductor is connected with another conductor 87 leading to the outside conductor 54. In the conductor 87 is a capacitor 88.

The subcircuit 50 further includes a charge sensing relay 86 which in itself is of known kind, including reverse wound coils for more distinctly controlling the control actions thereof. This relay is included in the conductor 89 which includes the primary coil of that relay and connected with the conductor 89 is another conductor 90 connected with the secondary of the coil 86a.

The subcircuit 50 also includes another conductor 92 between the conductors 52, 54 and a resistor 94 is interconnected between this conductor and the other conductor 90. In the conductor 92 is a zener diode 96.

The subcircuit 50 includes another sensing relay 98, or standby relay having reverse wound coils, including a primary coil in a conductor 100 connected between conductors 52, 54 and a secondary coil in another conductor 102 which includes a resistor 104. The conductor 102 is connected with still another conductor 106 which is connected between the conductors 52, 54, the conductor 106 including a zener diode 108. Finally the subcircuit 50 includes conductor 110 which includes a signal light 112. Various ones of the conductors of the subcircuit 50 include contacts identified by the same reference numerals as the relays themselves, with different subscripts.

Included in the circuit is another subcircuit 114 which is directly associated with the subcircuit 50 and utilized in controlling the charging of the battery 28. The subcircuit 114 includes the SCR 72 identified above; leading from the gate of that diode is a conductor 116 in which is a diode 118, this conductor leading to the cathode of another SCR 120. The anode of that diode is connected by means of a conductor 122 from the conductor 70, and the gate is connected with a conductor 124 which includes a resistor 126 and leads to a center point 128 between resistors 130, 132 which are connected respectively with conductors 134, 136 connected with the secondary 60S2; the conductor 134 includes a diode 138 and a resistor 140; connected between the conductors 134, 136 is another conductor 142 including a capacitor 144; also another conductor 146 including a zener diode 148; finally another conductor 150 interconnects the conductors 134, 136 and icludes an adjustable resistor 152.

Another conductor 154 connects with the adjustable resistor 152 and with another adjustable resistor 156 in a conductor 158 connected between the conductors 74, 68. Still another conductor 160 leads from the anode of the SCR 120 to the conductor 124 and includes a capacitor 162.

The battery 28 is of a character and capacity to maintain the desired force for a certain period of time, such for example as 6 or 7 or 8 hours, and in order to check the condition of the battery and to recharge it, the subcircuit 50 is maintained in condition for that purpose. Upon closing the contacts 78c periodically, as referred to above, the relay 80 is energized, and thereupon, the contacts 80b are energized, opening the circuit to the relay 84, but the relay 84 does not beomce de-energized immediately, but only upon decay of the capacitor 88. Also upon energization of the relay 80, the contacts 80d complete the circuit from the rectifier 62 through the standby relay 86. If the battery voltage is below a pre-determined value, such for example, as 95 volts, the battery then begings charging from the source 22. The load resistor 85 is utilized for testing the condition of the battery periodically, and it is controlled through contacts 80c, 84c, this resistor 85 being interposed for checking the condition of the battery. After checking the battery, the relay 80 is again energized, the circuit being completed through contacts 80d, and the standby relay 86 being energized. This is a condition of charge and the charging operation continues until the battery 28 reaches a charge condition of 120 volts, and the relay 86 is energized. Upon energization of that relay, the contacts 86b retain the relay, and the contacts 86c energize the secondary coil of the relay for opposing the primary coil thereof and bringing the flux level of the relay into position for sensing and dropout at 115 volts DC.

When the voltage of the battery 28 falls below 95 volts, the relay 98 is de-energized, and by closure of the contacts 98d the low battery signal light 112 is energized, indicating the battery is operating under a low voltage condition. When the timer test signal relay 78 is energized, in cycle, the contacts 80e are closed, energizing the primary coil of the sensing relay 98. When the battery voltage again reaches 110 volts, the sensing relay 98 is energized and at that time the secondary coil of that relay is energized through contacts 98c; the latter coil is retained by contacts 98b, this forming a complete cycle. It will be understood that the reverse wound relays 86 and 98 are adjustably set to effect the charging of the battery within the voltage values mentioned.

The secondary 60S1 remains in condition to charge the battery 28, when enabled through the subcircuit 114. The portion of the circuit including the conductor 124 from the gate of the SCR 120 and leading to the point 128, with the resistors 130, 132, form a positive portion of the circuit. The resistor 132 provides approximately 0.5 volts negative AC, and the center arm of the resistor 152 assumes a negative condition and provides the return of the gate of the SCR 120, this condition providing a positive condition through the resistor 126 and then through the cathode of that SCR 120 to the diode 118 and then through the gate of the SCR 72 and then through the cathode of that SCR and back through the resistor 156, the latter then providing a voltage drop substantially equivalent to one cell of the battery 28 or in the neighborhood of 13.5 volts. It is to be noted, however, that the entire voltage of the battery is utilized.

The capacitor 162 provides the SCR 120 with a differential of approximately 1½ volts DC and this circuit functions from the battery voltage and the reference supply of the 14.6 volt zener regulated circuit 114. As the battery voltage is increased, due to the charging function, the battery provides a negative supply which nullifies the positive bias of the regulated 14.6 voltage impressed on the SCR 120 and this stops conduction of that SCR and in turn stops conduction of the SCR 72. This circuit 114, thus provides absolute triggering and sharp cutoff at any level of battery voltage desired and provides a feature whereby close battery voltage may be maintained and to prevent overcharging.

Reference is now made to FIG. 3 showing the circuit of an alternative arrangement. This circuit includes a normal AC electrical source 170 and lines 172 from that source lead to a charger circuit 174 and a power circuit 176. The charger circuit 174 includes a transformer 178 while the circuit 176 includes a transformer 180.

As above, relays and transformers are identified in their entirety by a major reference numeral, and the components thereof identified with the same reference numeral with different subscripts.

The secondary 180S2 is included in a circuit 182 which includes a rectifier 184 in a circuit 185 for providing DC to a reverse wound latch relay 186 and a release relay 188. Also the subcircuit 185 includes "hold" switch 190 and a "release" switch 192 as well as relay contacts to be referred to again hereinbelow.

The secondary 180S1 is included in a subcircuit 194 and in this circuit also is a rectifier 196 leading to another subcircuit 198 which includes the magnet 20. In the subcircuit 194 is a standby relay 200 which corresponds with the main relay 40 in FIG. 3, connected with the secondary 180S1; also included in the subcircuit 194 is an indicating pilot light 202.

The subcircuit 198 includes a current relay 204 in series with the magnet, utilized for controlling the circuit according to the condition of the magnet. The subcircuit 198 also includes relay contacts 188b, 188c, 188d 188e for reversing the circuit through the magnet.

The circuit of FIG. 3 includes the posts 36, 38 at the magnet 20, and equivalent posts 36a and 38a positioned at a different location for convenience in consideration of the circuit.

The charger circuit 174 includes transformers 206, 208 connected with the secondary 178S and leading respectively to back-to-back SCR's 210a and 210b, and 212a, 212b. A conductor 214 interconnects the SCR's 210b, 212b and this leads to another conductor 215 connected with an anode of an SCR 218, and a conductor 216 leads from the cathode thereof to another conductor 220 which includes a diode 222 and connects with the secondary 178S. The conductor 220 also includes a capacitor 224, and in turn is again connected with the conductor 214.

The charger circuit 174 also includes a portion 226 which includes an electrical source 228 which may be for example a secondary of the transformer 178, leading to an SCR 230. This circuit also includes back-to-back diodes 232, 234 and another conductor 236 including a capacitor 238, and a zener diode 240 connected at a midpoint of a coil 242.

The circuit of FIG. 3 includes the conductors 24, 26 leading to the magnet, and connected between these conductors is another conductor 244 which includes a test signal relay 246. Also connected between these main conductors is another conductor 248 including apilot light 250, operated by the battery for indicating the condition thereof.

The circuit of FIG. 3 includes a subcircuit 250 generally equivalent to the subcircuit 50 in FIG. 2, including conductors 252, 254 and the battery 28 as well as a volt meter 255 parallel with the battery. The subcircuit includes a battery test load timing relay 256 and a capacitor 258 and a load resistor 260, connected across the conductors 254, 256. The subcircuit also includes a reverse wound charge sensing relay 262, the primary coil of this relay being connected in a conductor 264 having contacts 246e. Holding contacts 262b are also provided and the secondary coil connected in a conductor 266 having an adjustable resistor 268 therein, this conductor being connected to another conductor 270 which includes a zener diode 272.

The subcircuit additionally includes a reverse wound battery sensing relay 274 arranged similarly to the relay 262, the primary being in a conductor 276 having contacts 262d and holding contacts 274b. The secondary coil is connected in a conductor 276 having an adjustable resistor 278, this conductor being connected with another conductor 280 having a zener diode 282. Finally a conductor 284 is included having a low battery signal light 286.

The switch 170A of the main switch means 170 energizes the subcircuit 250, being connected at one end to the conductor 254 and at the other end to the conductor 26. The siwtch 170A is connected to a conductor 290 having a diode 288 therein, and including in addition to the contacts 262e, 246b an ammeter 292.

The system includes a direct current control means for operating the latch and unlatch relays 186, 188, and it includes automatic control circuit utilizing zener voltages and dual wound relays for automatic signalling purposes to indicate low battery conditions, or if the battery is in proper operating order for use as an emergency voltage, of if charging is required. It will be noted that both the charger circuit 174 and power circuit 176 are connected in parallel with the same disconnect swtich 170.

When the transformer 180 is energized, the relay 200 is energized, this relay constituting the safety standby relay. The normally closed contacts of the relay are incorporated in the conductors 24, 26 interupting circuit from the battery. To energize the magnet, the hold push button 190 is depressed which energizes latch relay 186, which in turn de-energizes release relay 188. At this point, the contacts 188d, 188e are closed connecting the magnet in circuit with voltage in a first direction. Also upon energization of relay 186, the rectifier 196 is energized through contacts 186d, and the magnet is energized.

When the magnet is fully saturated, current relay 204 is energized, this relay being used for controlling the decay current to the magnet during the releasing cycle. When voltage is applied to the terminals of the magnet, the test signal relay 246 is energized, and if the battery is of sufficient voltage, contacts 246e are closed, energizing the primary winding of the sensing relay 262, this relay then being retained by contacts 262b. Upon energization of the relay 262, contacts 262c energize the secondary winding through the zener regulated circuit 272.

Energization of relay 262 closes contacts 262d and energizes the primary winding of the relay 274 which is retained through contacts 274b. Upon energization of the relay 274, the secondary winding thereof is energized through the zener 282 by contacts 274c. The relay 262 provides a means of indicating when a charge is required, and thus the voltage setting of this relay is such that the relay will drop out when the battery voltage drops to a point in which charging is required, and at this time the relay 262 is de-energized, permitting the contacts 262e to close.

If the battery should become defective through for example sediment falling off the plates, and preventing the battery from maintaining a charge, the battery voltage will drop to a point where the relay 274 will de-energize, and this will indicate the battery is below a minimum voltage and the signal light 286 will glow. The volt meter 255 will indicate the precise condition.

In releasing the magnet the release button 192 is depressed, completing circuit through the secondary of the relay 186, and de-energizing that relay, and the AC power to the rectifier 196 is de-energized and the magnet immediately begins to decay, holding in relay 204 until the decay current is at a negligible point, and the relay 204 then de-energizes. At this time, while still holding the release push button 192 depressed, the relay 188 is energized and this reverses the polarity to the magnet through contacts 188b, 188c, and opens the other related contacts 188d, 188e, and at the same time applies a lower voltage to the rectifier 196 through closed contacts 186d, the contacts 186c being opened. After the load is released, the release button may be released.

The circuit also includes an automatic charging subcircuit. The center tap from the secondary 178S1 leading to the SCR's 210a, 212a, offers a current signal fed back into the circuit including the transistor 230 for current regulation, in the event the battery is run down and requires extreme charging current. The firing circuit of the SCR's 210a, 212a, is controlled through the DC supplied by the diodes 222 and the zener regulated circuit 240, and the transistor connected between the gate resistors 229, 231, and the gates of the SCR's 210b, 212b. The secondary windings 206S, 208S furnish voltage to the SCR's 210b, 212b bias, and furnish voltage through capacitors 237, 239, and then to the gates of the SCR's 210b, 212b for furnishing a negative bias. DC bias controllable through the transistor 230, controls the firing circuit for the SCR's 210b, 212b which in turn control through transformers 206, 208, for firing the SCR's 210a, 212a. The transistor 230 conducts through the collector base resistor 233, this conduction being adjustable by the adjustable resistor. The secondary 178S2 provides rectified and filtered voltage to the emitter of the transistor 230, for stopping conduction in the event current in excess of a predetermined amount is drained through the primary resistor 235 and the secondary 178S2. If the charging current is normal and the voltage is lower than the preset amount on the zener regulated circuit 213, the auxiliary SCR 218 is rendered conducting through the gate resistor 219, and it starts conduction of the firing circuit of the SCR's 210b, 212b, and when the battery voltage has once regained the full value, and the voltage drop across the resistor in series with the capacitor.

The arrangement of FIG. 4 is similar to that of FIG. 1 where the main source is DC, but with the addition of the diode rectifier 295 in the conductor 30, to provide a "floating battery". In this case, the main source 22 is maintained higher than the battery so that so long as the main source remains energized, there is no drain from the battery to the magnet, and if the main source should fail, the battery becomes effective for energizing the magnet. This arrangement eliminates the need for the relay contacts 40c, d, and e, and for charging the battery and related functions, the other portions of FIGS. 2 and 3 may be utilized.

The invention is not limited to use with magnets, but is equally useful for merely charging batteries regardless of the application of the batteries, with all of the advantages of automatic signalling, automatic charging, automatic termination to prevent overcharging, and prevention of excessive charging current.

I claim:

1. Means for controlling magnetization of a magnet in conjunction with a main source of electricity, comprising, first circuit means connecting the main source with the magnet,
a standby source of electricity,
second circuit means connecting the standby source with the magnet,
relay circuit means incorporated in the first circuit means,
relay means including a control member in the relay circuit means and contacts in the first and second circuit means,
the relay means and relay circuit means being operative, in response to energization of the main source, for holding the first circuit means closed, and the second circuit means open, and in response to de-energization of the main source, for holding the first circuit means open and the second circuit means closed,
means for charging the standby source by the main source, and,
the means for charging the standby source including means operative independently of the charge condition of the standby source for periodically connecting the standby source with the main source for charging the standby source.

2. Means for controlling magnetization of a magnet in conjunction with a main source of electricity, comprising, first circuit means connecting the main source with the magnet,
a standby source of electricity,
second circuit means connecting the standby source with the magnet,
relay circuit means incorporated in the first circuit means,
relay means including a control member in the relay circuit means and contacts in the first and second circuit means,
the relay means and relay circuit means being operative, in response to energization of the main source, for holding the first circuit means closed, and the second circuit means open, and in response to de-energization of the main source, for holding the first circuit means open and the second circuit means closed,
the standby source being operative for energizing the magnet when the first circuit means is open and the second circuit means is closed, and
visual indicator means to show when the magnet is being energized by the standby source.

3. Means for controlling magnetization of a magnet in conjunction with a main source of electricity, comprising, first circuit means connecting the main source with the magnet,
a standby source of electricity,
second circuit means connecting the standby source with the magnet,
relay circuit means incorporated in the first circuit means,
relay means including a control member in the relay circuit means and contacts in the first and second circuit means,
the relay means and relay circuit means being operative, in response to energization of the main source, for holding the first circuit means closed, and the second circuit means open, and in response to de-energization of the main source, for holding the first circuit means open and the second circuit means closed,
a test circuit which includes the standby source,
the test circuit including means operative, when the standby source is periodically put in circuit, and responsive to the charge condition of the standby source, for connecting the standby source with the main source when the voltage level of the standby source is below a predetermined value, the test circuit including means for adjusting the point of effective operation of the circuit for adjusting the point of low voltage value of the standby source for connecting the standby source with the main source.

4. Controlling means according to claim 3 wherein the adjusting means includes reverse wound relay means for accurately defining the voltage point of the battery at which the battery is connected with the main source.

5. Controlling means according to claim 2 and including a test circuit for putting the battery in circuit therein,
the test circuit including a low battery voltage sensing relay and operative for connecting the test circuit in circuit with the main source in response to the voltage of the battery lowering to a predetermined value.

6. Controlling means according to claim 5 wherein the test circuit includes reverse wound relay means and adjustable resistor means for adjustably setting the relay means for sensing the battery at a predetermined voltage value.

7. Means for controlling the magnetism of a magnet in conjunction with a main source of AC, comprising,
a power circuit deriving AC from the main source and including a first transformer circuit which includes a rectifier and latch relay means and a release relay means controlled thereby,
the power circuit including a second transformer circuit which includes rectifier means and the magnet to be controlled, and providing DC to the magnet,
a standby source,
relay means in the second transformer circuit for controlling the connection of the standby source with the magnet,
means responsive to the latch relay means for controlling the connection of the magnet with the main AC source, and
means responsive to the voltage condition of the magnet for releasing the latch relay means.

8. Controlling means according to claim 3 and including reversing switch means in the second transformer circuit for reversing current to the magnet, and
the latch relay release means is operative for controlling the direction of current to the magnet.

9. Controlling means according to claim 8, and including a current relay in series with the magnet and operative for controlling the latch relay release means, and thereby the reversing switch means, in response to the condition of the magnetism of the magnet.

10. Controlling according to claim 9 wherein the current relay means is operative for directing current to the magnet in magnetizing direction upon the value of the magnetism lowering to a predetermined minimum and for directing it in demagnetizing direction upon the value of the magnetism rising to a predetermined maximum.

11. Means for controlling the magnetism of a magnet in conjunction with an AC main source of electricity, comprising,
first circuit means connecting the main source with the magnet,
a standby source of electricity,
second circuit means connecting the standby source with the magnet,
rectifier means interposed between the main source and the magnet for converting the AC to DC and imposing it on the magnet,
transformer means deriving power from the AC source,
a test circuit including the standby source,
second rectifier means between the transformer means and the standby source for delivering DC to the standby source,
SCR means between the second rectifier means and the standby means, and
zener control means in the test circuit for controlling the circuit means between the second rectifier means and the standby means.

12. Controlling means according to claim 11 wherein the zener circuit means includes reverse wound relays, and zener rectifiers for controlling the reverse wound relays.

13. Controlling means according to claim 7 and including manual switch means for controlling the latch relay means and operative on actuation thereof for controlling voltage value in the second transformer circuit and thereby the voltage value imposed on the magnet.

14. Controlling means according to claim 13 and including release relay means,
and also including a current relay in series with the magnet, and
circuit means responsive to the release relay for reversing the voltage imposed on the magnet, and therethrough operative for demagnetizing the magnet, and the circuit including means controlled by the current relay for de-energizing the release relay means pursuant to the release relay means being energized, whereupon a load held by the magnet is released therefrom upon the voltage value of the magnet diminishing to a predetermined point.

15. Controlling means according to claim 14 and including voltage relay means controlled by the voltage value of the magnet, and means controlled by the voltage relay means for testing charge conditions of the standby source.

16. Controlling means according to claim 15 and including sensing means having a component for sensing the condition of charge of the standby source, and the low voltage value of the standby source.

17. Controlling means according to claim 13 and including manual switch means for controlling the release relay means,
the release relay means being normally de-energized and being energized by the manual release button, and also being released pursuant to the voltage value of the magnet being diminished substantially to zero.

* * * * *